(12) United States Patent
Watanabe

(10) Patent No.: US 6,455,802 B2
(45) Date of Patent: Sep. 24, 2002

(54) RESISTANCE WELDING POWER SUPPLY APPARATUS

(75) Inventor: Mikio Watanabe, Chiba-ken (JP)

(73) Assignee: Miyachi Technos Corporation, Chiba-ken (JP)

( * ) Notice: Subject to any disclaimer, the term of this patent is extended or adjusted under 35 U.S.C. 154(b) by 0 days.

(21) Appl. No.: 09/884,015

(22) Filed: Jun. 20, 2001

(30) Foreign Application Priority Data

Jun. 23, 2000 (JP) ........................................ 2000-189506

(51) Int. Cl.[7] .............................................. B23K 11/26
(52) U.S. Cl. ........................................ 219/113; 219/110
(58) Field of Search ................................. 219/113, 110

(56) References Cited

U.S. PATENT DOCUMENTS 5,149,933 A * 9/1992 Donner ....................... 219/113
6,321,167 B1 * 11/2001 Jochi et al. ................. 219/110

\* cited by examiner

*Primary Examiner*—Clifford C. Shaw
(74) *Attorney, Agent, or Firm*—Wenderoth, Lind & Ponack, L.L.P.

(57) ABSTRACT

A resistance welding power supply apparatus comprises a large-capacitance capacitor for storing resistance welding energy, a capacitor charging circuit, a switching element electrically connected between the capacitor and one electrode of a pair of welding electrodes, and a control unit for the switching element. If the welding current is less than a set current value at a point of time on the leading edge of a clock, then the control unit holds a control pulse for the switching element active or high from that point of time till the time when the welding current exceeds the set current value without being affected by the cycle of the clock. If the welding current exceeds the set current value at a point of time on the leading edge of the clock, then the control unit holds the control pulse inactive or low till a point of time on the leading edge of the next clock.

4 Claims, 6 Drawing Sheets

$Q_1, Q_2 = ON$
$Q_3, Q_4 = OFF$ $Q_1 = OFF, Q_2 = ON$
$Q_3, Q_4 = OFF$ $Q_1, Q_2 = OFF$
$Q_3, Q_4 = ON$ $Q_1, Q_2 = OFF$
$Q_3 = OFF, Q_4 = ON$

RESISTANCE WELDING POWER SUPPLY APPARATUS

BACKGROUND OF THE INVENTION

1. Field of the Invention

The present invention relates generally to a power supply apparatus for resistance welding, and more particularly, to a power supply apparatus designed to supply a controlled welding current via a switching element to workpieces from a capacitor storing welding energy as electric energy therein.

2. Description of the Related Arts

Up until now, such a resistance welding power supply apparatus has employed switching transistors as the switching element to provide a switching control of the switching transistors by pulse-width modulation (PWM).

The PWM is a technique for variably controlling the pulse width of an active level (e.g., high level) within each cycle at every fixed switching cycle defined by a clock. The PWM is used to effect a constant-current control allowing the welding current to conform to a set current value so that a switching control can be provided for correcting a deviation of the welding current relative to the set current value for each switching cycle.

The above transistor-based resistance welding power supply apparatus has often been applied to precision spot welding whose workpieces are mainly precise small-sized metal members such as electronic components. In such precision spot welding, desired welding energy must properly be supplied to the workpieces within an extremely brief weld time (e.g., 10 ms or below), which needs a finer and more rapid constant-current control.

It was however difficult for the conventional transistor-based resistance welding power supply apparatus using PWM to rapidly and finely correct the deviation or error upon the rise of current or upon the unexpected current variation in the constant-current control due to the fact that the switching control is restrained by the condition $0<T_w<T_c$ for each switching cycle where $T_c$ is a cycle of the switching cycle and $T_w$ is a pulse width of the control pulse fed to the switching transistors for each switching cycle.

SUMMARY OF THE INVENTION

The present invention was conceived in view of the above problem involved in the prior art. It is therefore the object of the present invention to provide a resistance welding power supply apparatus capable of implementing a fine and rapid constant-current control and ensuring an improved resistance welding work quality.

In order to attain the above object, according to the aspect of the present invention there is provided a resistance welding power supply apparatus having a pair of welding electrodes through which a welding current flows, the pair of welding electrodes adapted to come into pressure contact with workpieces to effect a resistance welding on the workpieces, the power supply apparatus comprising a capacitor which stores electric energy for resistance welding in the form of electric charges; switching means for the supply of current electrically connected between the capacitor and one electrode of the pair of welding electrodes; and switching control means which, for the purpose of controlling the welding current during the supply of current for resistance welding, provide a control of the switching means such that, if the welding current is less than a set current value at a point of time of monitoring defined to occur at every predetermined time interval, then the switching control means keep the switching means in ON-state from the point of time of monitoring till the time when the welding current exceeds the set current value and that, if the welding current exceeds the set current value at the point of time of monitoring, then the switching control means keep the switching means in OFF-state till the next point of time of monitoring.

In the resistance welding power supply apparatus of the present invention, if the welding current is less than a set current value at a monitoring point defined at predetermined time intervals which is typically given by a clock, then the switching element is continuously kept in ON-state from that monitoring point till the time when the welding current exceeds the set current value without being affected by the clock cycle, whereas if the welding current exceeds the set current value at the monitoring point, then the switching element is continuously kept in OFF-state till the next monitoring point. Such a switching control allows the switching element to be turned on or off at an unfixed (non-cyclic) timing which is not restrained by the clock cycle to thereby correct (approximately to zero) the deviation or error of the welding current relative to the set current value in a minimum time and realize the rapid and fine constant-current control.

BRIEF DESCRIPTION OF THE DRAWINGS

The above and other objects, aspects, features and advantages of the present invention will become more apparent from the following detailed description when taken in conjunction with the accompanying drawings, in which.

DESCRIPTION OF THE PREFERRED EMBODIMENTS

The present invention will now be described with reference to the accompanying drawings which illustrate a preferred embodiment thereof in a non-limitative manner.

Figure 1:
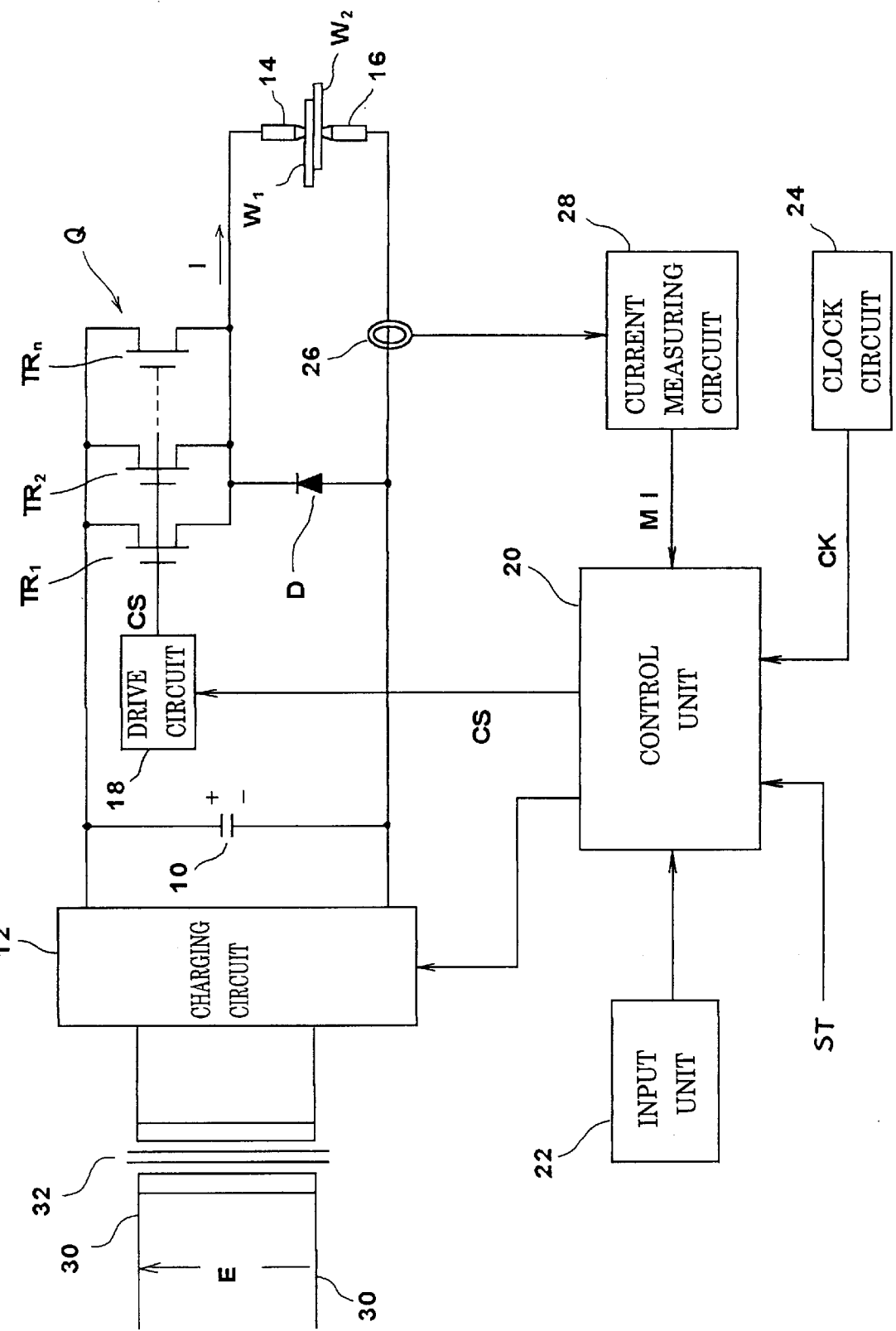
FIG. 1 is a circuit diagram showing a configuration of a resistance welding power supply apparatus in accordance with an embodiment of the present invention.

Referring first to FIG. 1 there is depicted a configuration of a resistance welding power supply apparatus in accordance with the embodiment of the present invention. The resistance welding power supply apparatus comprises a large-capacitance capacitor 10 for storing resistance welding energy in the form of electric charges, a charging circuit 12 for charging the capacitor 10 to a predetermined voltage, a switching element Q electrically connected between the capacitor 10 and one electrode of a pair of welding electrodes 14 and 16, and a control unit 20 which allows a switching operation of the switching element Q via a drive circuit 18 during the supply of welding current to provide a control of a welding current I. The welding electrodes 14 and 16 are coupled to a pressure mechanism not shown and come into pressure contact with workpieces ($W_1$ and $W_2$) during the welding work.

The switching element Q of this embodiment consists of a single or a plurality of switching transistors, e.g., FETs (field effect transistors) $TR_1$ to $TR_n$ which are connected in parallel. The switching element Q has a current input terminal connected to a positive electrode of the capacitor 10 and has a current output terminal connected to the welding electrode 14. A freewheeling diode D is connected between the current output terminal of the switching element Q and a negative electrode of the capacitor 10.

The control unit 20 is comprised of, e.g., a microprocessor (CPU) or a dedicated logic circuit and, in compliance with a predetermined program or procedure, provides controls of respective parts such as a welding current sequence control, a constant-current control and a capacitor charging control. The control unit 20 accepts various set values from an input unit 22 including e.g., a keyboard and accepts a clock signal CK of e.g., 250 kHz for switching control.

For measurement or feedback of the welding current I in the constant-current control, a toroidal coil 26 acting as a current sensor is fitted to a conductor extending between the freewheeling diode D and one of the welding electrodes 14 and 16 so that on the basis of an output signal of the current sensor 26, a current measuring circuit 28 can feed a current measured value (instantaneous value) MI of the welding current I as an analog signal to the control unit 20 in real time. The control unit 20 generates a non-cyclic control pulse CS as will be described later on the basis of the current measured value from the current measuring circuit 28 so as to provide a switching (ON/OFF) control of the switching element Q via the drive circuit 18 by use of the control pulse CS. It is to be noted that the current measuring circuit 28 may give a digital current measured value MI to the control unit 20 at a higher clock rate than the clock signal CK.

Via a step-down transformer 32, the charging circuit 12 receives a single-phase AC power supply voltage E of a commercial frequency from an AC power supply line 30. The charging circuit 12 may be comprised of a single-phase rectifying circuit which serves to rectify a single-phase AC voltage from the transformer 32 into a DC voltage. A switching circuit for charging may be interposed between an output terminal of the rectifying circuit and the capacitor 10 to provide a finer and variable control of the charging voltage of the capacitor 10. For the charging control there may further be provided voltage measuring means not shown which measure the charging voltage of the capacitor 10.

Figure 2:
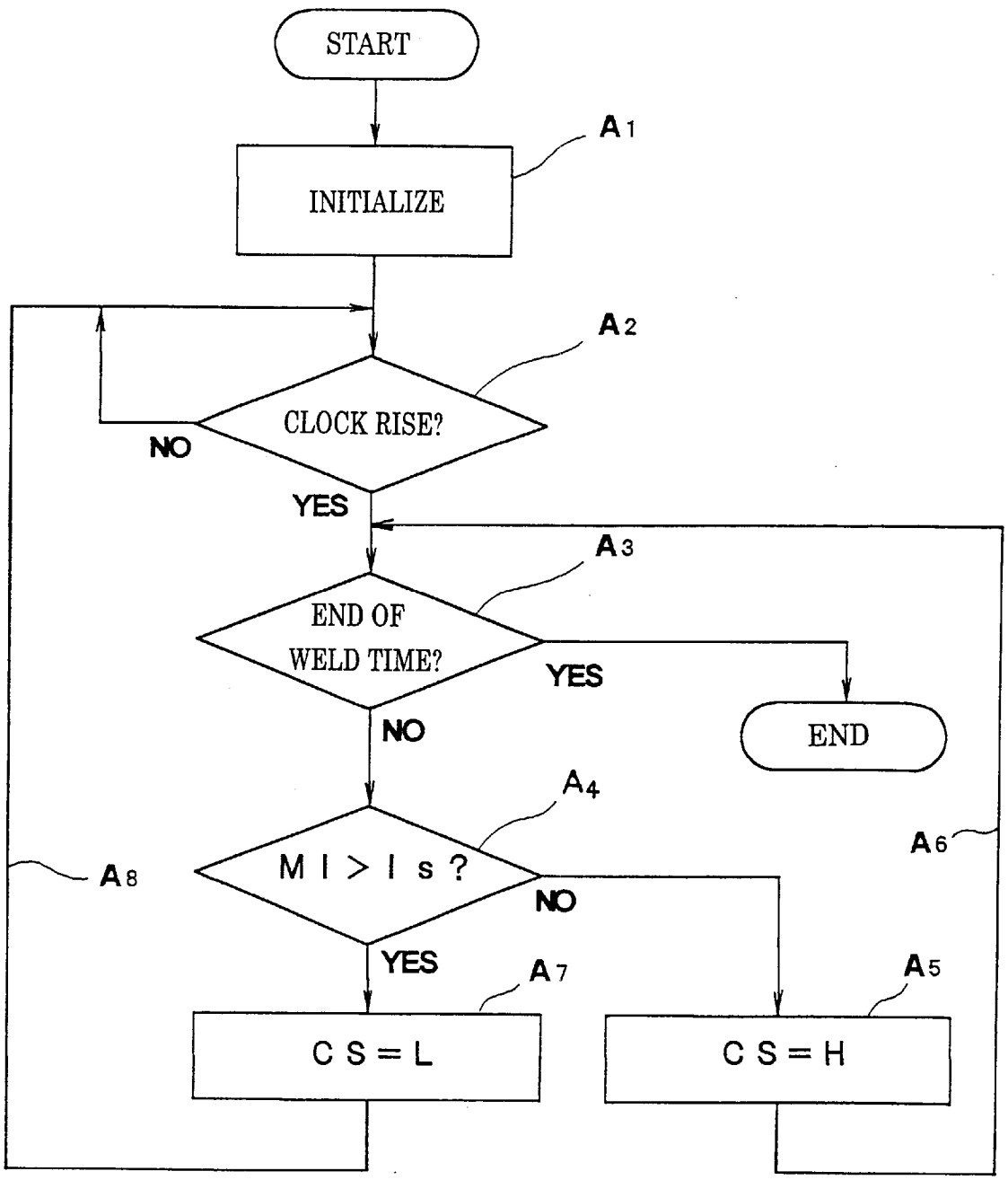
FIG. 2 is a flowchart showing a procedure of a welding current control effected in the embodiment.
Figure 3:
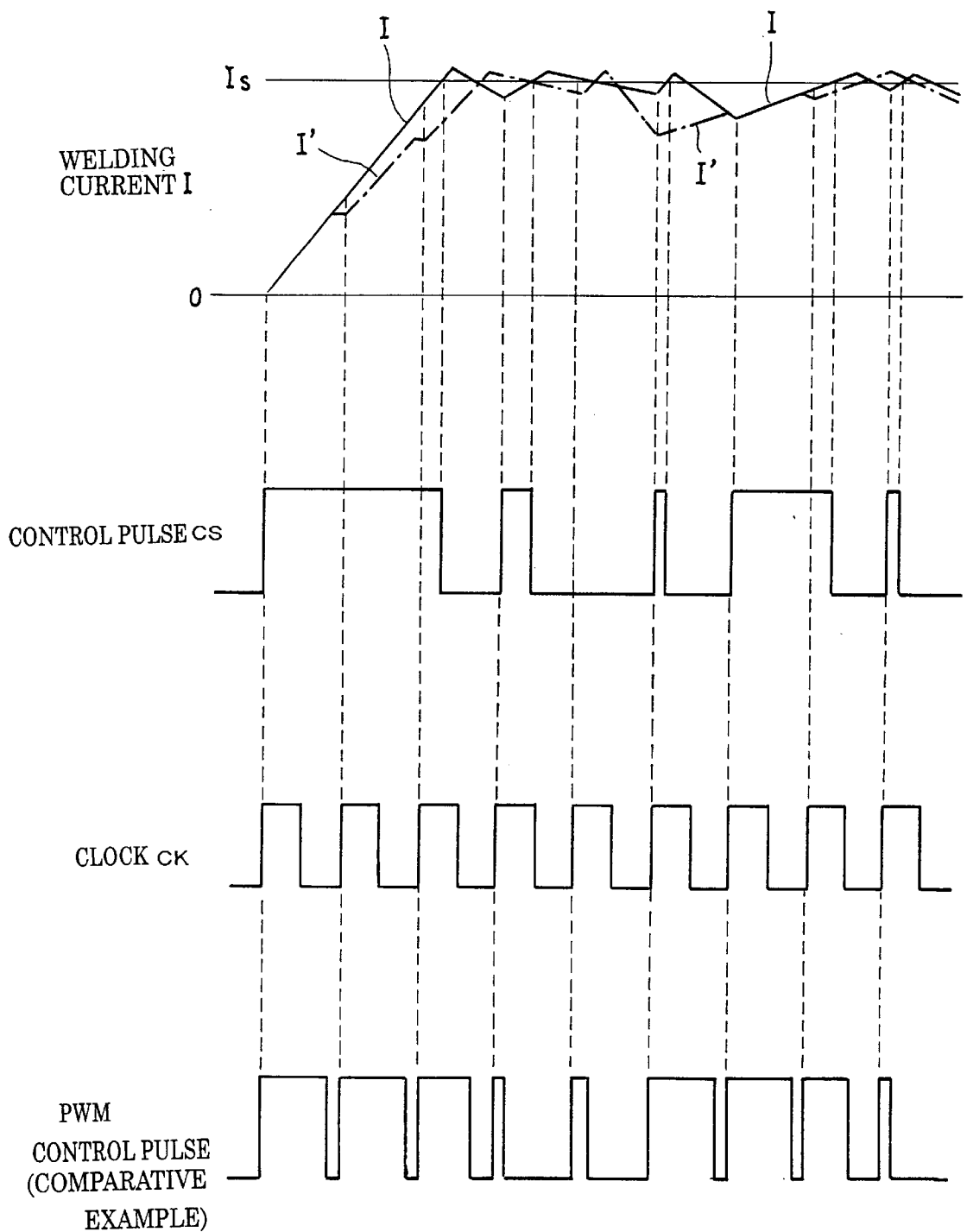
FIG. 3 illustrates waveforms of currents or signals which may appear at major parts of the embodiment.

FIG. 2 depicts a procedure of the welding current control provided by the control unit 20 of this embodiment, and FIG. 3 depicts signal or current waveforms which may appear at major parts of this embodiment. FIG. 3 further shows as a comparative example a waveform of a control pulse and a waveform of the welding current (I') in PWM control.

When the control unit 20 accepts a start signal ST from an external device not shown of a work transfer system for example, it activates a pressure mechanism to allow the welding electrodes 14 and 16 to come into pressure contact with the workpieces ($W_1$ and $W_2$) by a predetermined pressing force and then executes supplying a welding current.

First, the control unit 20 initializes the respective parts of the welding current control system (step $A_1$) and sets various set values (weld time $T_g$, welding current value $I_s$, etc.) of the welding schedules into respective predetermined registers. At this point of time, the switching element Q is left in OFF-state.

Then, upon receipt of a clock CK (step $A_2$), the control unit 20 compares a measured value MI of the welding current I acquired from the current measuring circuit 28 with a current set value $I_s$ in response to the leading edge of the clock CK (step $A_4$).

When the current measured value MI is smaller than the current set value $I_s$ (MI<$I_s$) in this comparison, the control unit 20 sets the control pulse CS active, e.g., high (step $A_5$). When the control pulse CS goes high, the switching element Q turns on to allow a DC welding current I to flow through a path or circuit extending from the positive electrode of the capacitor 10, the switching element Q, the welding electrode 14, the workpieces ($W_1$ and $W_2$), the welding electrode 16 and the negative electrode of the capacitor 10. The welding current I is based on discharge of the capacitor 10 and transiently increases with the elapse of time.

After setting the control pulse CS high as described above, the control unit 20 continues to monitor the welding current measured value MI from the current measuring circuit 28 without regard to the cycle of the clock CK (steps $A_6 \rightarrow A_3 \rightarrow A_4 \rightarrow A_5 \rightarrow A_6$) and, when the welding current measured value MI exceeds the current set value $I_s$, returns the control pulse CS to low (steps $A_4 \rightarrow A_7$). Therefore, immediately after the start of the current supplying, the welding current I rises substantially linearly until the welding current I exceeds the set current value $I_s$ as depicted in FIG. 3. During this current rise, the control pulse CS remains high without being affected (interrupted) by the cycle of the clock CK. After return of the control pulse CS to low after completion of the rise of the welding current I, the control unit 20 waits for the rise of a subsequently incoming clock CK (steps $A_8 \rightarrow A_2$).

When the control pulse CS goes low, the switching element Q is turned off to bring the discharge of the capacitor 10 to a termination. Then, the welding current I continues to flow through a circuit starting from the welding electrode 14 and passing through the workpieces ($W_1$ and $W_2$), the welding electrode 16 and the freewheeling diode D and returning to the welding electrode 14. It is to be understood that the welding current I flowing through the circuit is a freewheeling current generated by the inductance of the load circuit and hence decreases with the elapse of time.

Upon receipt of the next clock CK with the control pulse CS being low, the control unit 20 compares the welding current I with the set current value Is at the timing of the leading edge of that clock CK (step $A_4$).

Provided that the current measured value MI exceeds the current set value $I_s$ in this comparison (MI>$I_s$), the control unit 20 keeps the control pulse CS low (step $A_7$) and waits intactly for receipt of the next clock pulse CK (steps $A_8 \rightarrow A_2$). Thus, the welding current I continues to decrease substantially monotonically during at least that clock cycle.

On the contrary, if the current measured value MI is less than the current set value $I_s$ (MI<$I_s$), then the control pulse CS is set high in the same manner as the above (step $A_5$). This allows the switching element Q to turn on at the timing of the leading edge of the clock CK in that clock cycle, with the result that the welding current I increases in turn. The control unit 20 continues to increase the welding current I while keeping the control pulse CS high (thereby leaving the switching element Q in ON-state) without regard to the cycle of the clock CK (steps $A_6 \to A_3 \to A_4 \to A_5 \to A_6$). At the time when the welding current I exceeds the set current value $I_s$, the control unit 20 returns the control pulse CS to low to turn off the switching element Q (steps $A_4 \to A_7$). The control unit 20 then waits for receipt of the next clock CK (steps $A_8 \to A_2$).

In the constant-current control of this embodiment, in this manner, if the welding current I is less than the set current value $I_s$ at a point of time on the leading edge of the clock CK, then the control pulse CS for the switching element Q is held active or high, without being influenced by the cycle of the clock CK, from that point of time till the time when the welding current I exceeds the set current value $I_s$, whereas if the welding current I exceeds the set current value $I_s$ at the leading edge of the clock CK, then the control pulse CS is held inactive or low till the leading edge of the next clock CK.

As seen in FIG. 3, the control pulse CS of this embodiment is generated by such a switching control as described above and therefore rises or falls at unfixed timing free from restriction of the cycle of the clock CK. However, by virtue of such a non-cyclic control pulse CS, it is possible to accurately cope with deviations or errors of the welding current I relative to the set current value $I_s$, thereby achieving more rapid and finer constant-current control than PWM. In particular, where a large deviation is present e.g., immediately after the start of the current supplying or due to the sharp impedance variations of the workpieces ($W_1$ and $W_2$), the deviation can be corrected to substantially null linearly or in the minimum time, whereupon it is possible to provide a stable and secure constant-current control even during the brief weld time in the precision spot welding, etc., and thus to ensure a good finish of weldment.

Figure 4:
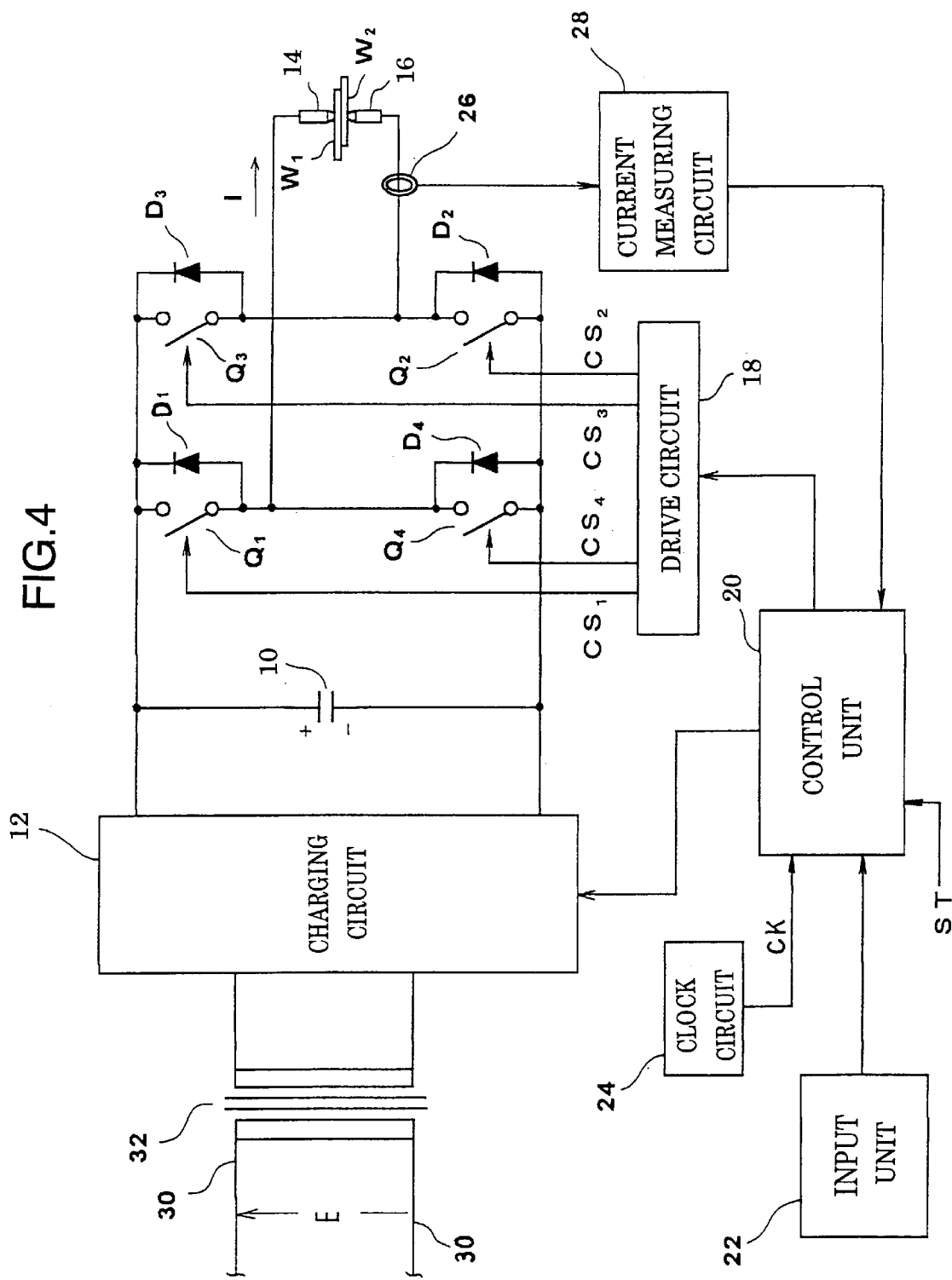
FIG. 4 is a circuit diagram showing a configuration of a resistance welding power supply apparatus in accordance with another embodiment of the present invention.

Reference is then made to FIG. 4 which illustrates a configuration of a resistance welding power supply apparatus in accordance with another embodiment of the present invention. In the diagram, same reference numerals are given to parts having substantially the same features or functions as the constituent elements of the power supply apparatus of the first embodiment (FIG. 1) described above.

In the resistance welding power supply apparatus of this embodiment, four switching elements $Q_1$, $Q_2$, $Q_3$ and $Q_4$ are connected as seen in FIG. 4 between the capacitor 10 and one of the welding electrodes 14 and 16. During the supply of welding current, the switching elements $Q_1$ to $Q_4$ are selectively switching operated to provide a control of the welding current I in a polarity-switchable fashion. The switching elements $Q_1$ to $Q_4$ may each be comprised of a single or a plurality of switching transistors, e.g., FETs ($TR_1$ to $TR_n$) which are connected in parallel.

The first switching element $Q_1$ has one terminal electrically connected to the welding electrode 14 and has the other terminal electrically connected to the positive terminal of the capacitor 10. The second switching element $Q_2$ has one terminal electrically connected to the welding electrode 16 and has the other terminal electrically connected to the negative terminal of the capacitor 10. The third switching element $Q_3$ has one terminal electrically connected to the welding electrode 16 and has the other terminal electrically connected to the positive terminal of the capacitor 10. The fourth switching element $Q_4$ has one terminal electrically connected to the welding electrode 14 and has the other terminal electrically connected to the negative terminal of the capacitor 10. In parallel with the switching elements $Q_1$, $Q_2$, $Q_3$ and $Q_4$ are connected diodes $D_1$, $D_2$, $D_3$ and $D_4$, respectively, to be in an opposite polarities of current to corresponding ones of the switching elements.

The first to fourth switching elements $Q_1$, $Q_2$, $Q_3$ and $Q_4$ are independently switching (ON/OFF) controlled by first to fourth control pulses $CS_1$, $CS_2$, $CS_3$ and $CS_4$, respectively, which are given via the drive circuit 18 from the control unit 20.

In a positive current-supplying mode where the welding current I flows through the workpieces ($W_1$ and $W_2$) in a positive direction, the control unit 20 provides an ON/OFF control of the first and second switching elements $Q_1$ and $Q_2$ at a predetermined timing while keeping the third and fourth switching elements $Q_3$ and $Q_4$ in OFF-state.

Figure 5:
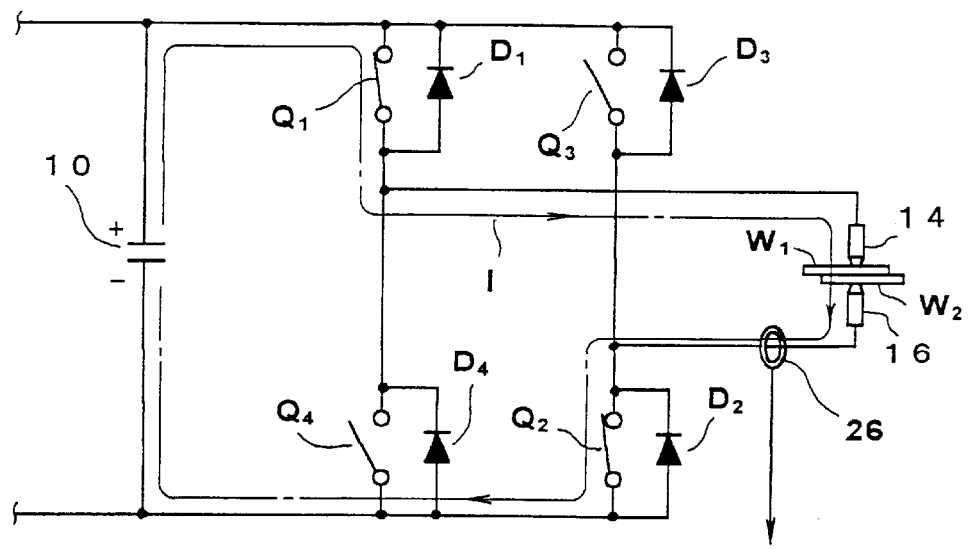
FIG. 5 illustrates a current-supplying circuit through which a welding current flows in one switching state in the power supply apparatus of the embodiment.
Figure 6:
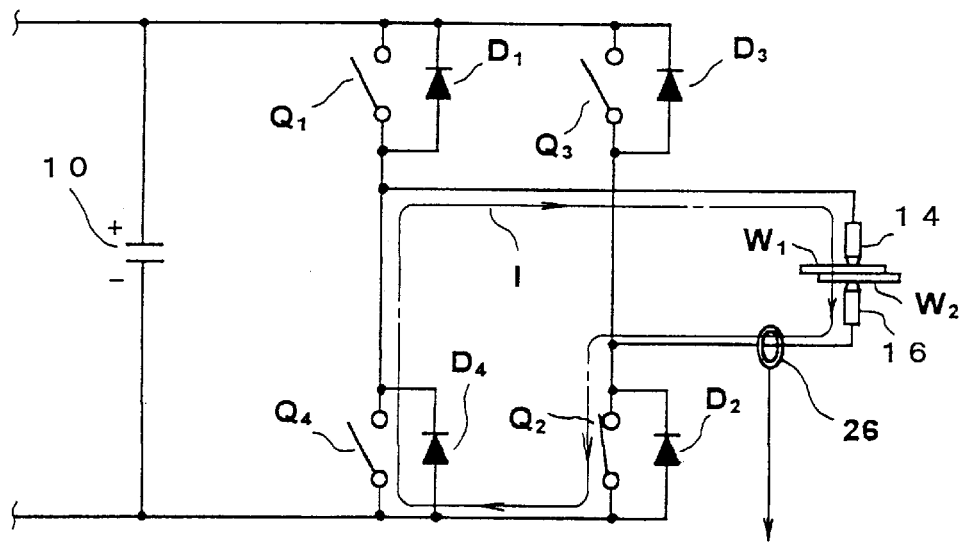
FIG. 6 illustrates a current-supplying circuit through which a welding current flows in one switching state in the power supply apparatus of the embodiment.

For example, as seen in FIGS. 5 and 6, for the duration of the positive current-supplying mode, the first switching element $Q_1$ may be ON/OFF controlled while keeping the third and fourth switching elements $Q_3$ and $Q_4$ in OFF-state but the second switching element Q2 in ON-state. In such a case, the control unit 20 may generate a control pulse $CP_1$ for the first switching element $Q_1$ in the same control procedure as the above embodiment (FIG. 2).

In a negative current-supplying mode where the welding current I flows through the workpieces ($W_1$ and $W_2$) in a negative direction, the third and fourth switching elements $Q_3$ and $Q_4$ are ON/OFF controlled at a predetermined timing while keeping the first and second switching elements $Q_1$ and $Q_2$ in OFF-state.

Figure 7:
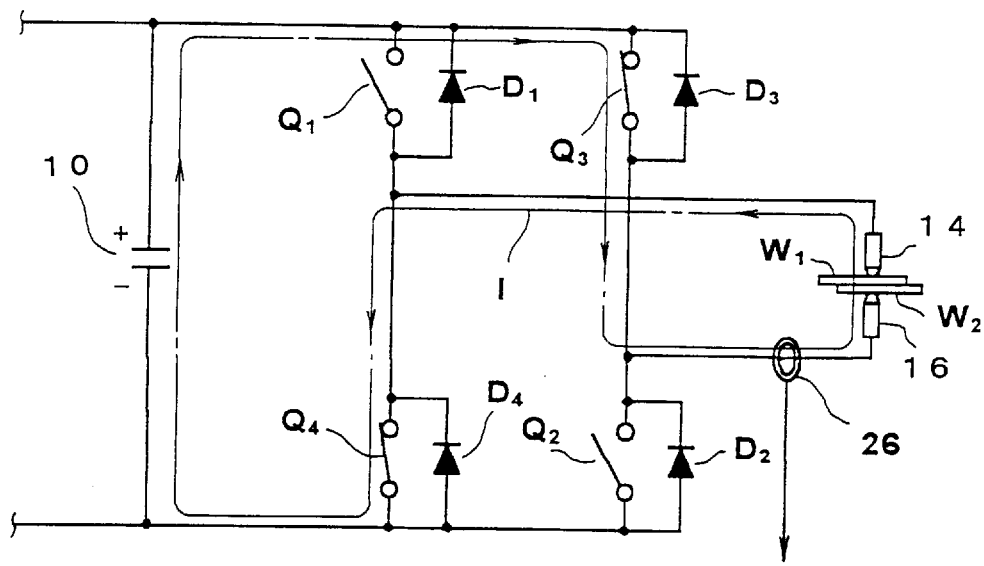
FIG. 7 illustrates a current-supplying circuit through which a welding current flows in one switching state in the power supply apparatus of the embodiment.
Figure 8:
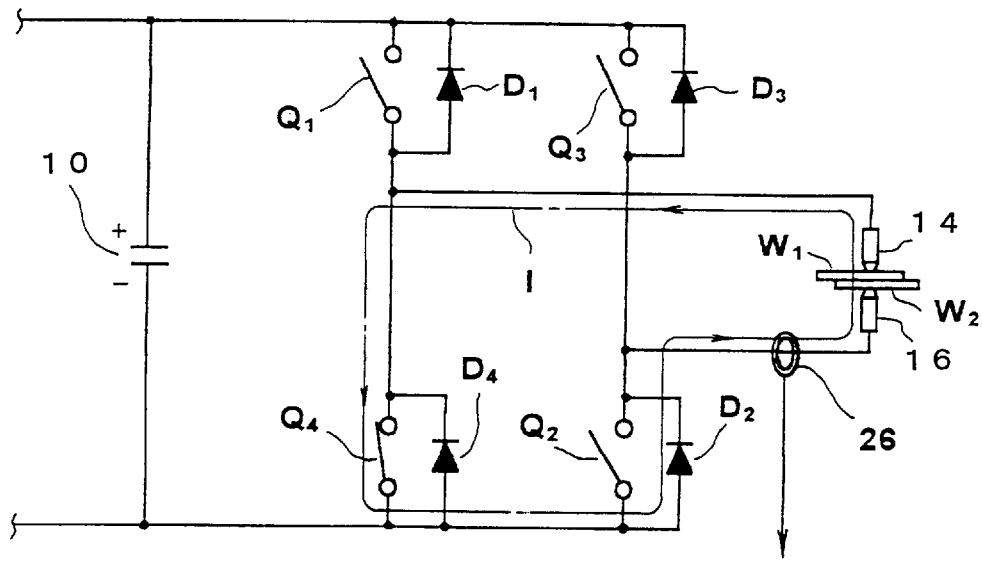
FIG. 8 illustrates a current-supplying circuit through which a welding current flows in one switching state in the power supply apparatus of the embodiment.

For example, as seen in FIGS. 7 and 8, for the duration of the negative current -supplying mode, the third switching element $Q_3$ may be ON/OFF controlled while keeping the first and second switching elements $Q_1$ and $Q_2$ in OFF-state but the fourth switching element $Q_4$ in ON-state. In this case as well, the control unit 20 may generate a control pulse $CP_3$ for the third switching element $Q_3$ in the same control procedure as the above embodiment (FIG. 2).

The power supply apparatus of this embodiment is conveniently applied to e.g., two-point simultaneous joining resistance welding (series welding) and makes feasible a high-speed, fine, stable and secure constant-current control with ensured good finish of weldment. Furthermore, effective switching can impart elongated service lives to the elements.

According to the resistance welding power supply apparatus of the present invention, as set forth hereinabove, it is possible to implement a fine and high-speed constant-current control and to improve the work quality of the resistance welding.

While illustrative and presently preferred embodiments of the present invention have been described in detail herein, it is to be understood that the inventive concepts may be otherwise variously embodied and employed and that the appended claims are intended to be construed to include such variations except insofar as limited by the prior art.

What is claimed is:

1. A resistance welding power supply apparatus having a pair of welding electrodes through which a welding current flows, said pair of welding electrodes adapted to come into pressure contact with workpieces to effect a resistance welding on said workpieces, said power supply apparatus comprising:

a capacitor which stores electric energy for resistance welding in the form of electric charges;

switching means for the supply of current electrically connected between said capacitor and one electrode of said pair of welding electrodes; and switching control means which, for the purpose of controlling said welding current during the supply of current for resistance welding, provide a control of said switching means such that, if said welding current is less than a set current value at a point of time of monitoring defined to occur at every predetermined time interval, then said switching control means keep said switching means in ON-state from said point of time of monitoring till the time when said welding current exceeds said set current value and that, if said welding current exceeds said set current value at said point of time of monitoring, then said switching control means keep said switching means in OFF-state till the next point of time of monitoring.

2. The resistance welding power supply apparatus according to claim 1, wherein said switching control means include current measuring means arranged to measure an instantaneous value of said welding current.

3. The resistance welding power supply apparatus according to claim 2, wherein said switching control means include a clock circuit which generates a clock signal giving said point of time of monitoring.

4. The resistance welding power supply apparatus according to claim 1, wherein said switching control means include a clock circuit which generates a clock signal giving said point of time of monitoring.

* * * * *